(12) United States Patent
Watanabe et al.

(10) Patent No.: US 12,529,674 B2
(45) Date of Patent: Jan. 20, 2026

(54) ELECTROCHEMICAL OXYGEN SENSOR AND METHOD FOR MANUFACTURING THE SAME

(71) Applicant: Maxell, Ltd., Kyoto (JP)

(72) Inventors: Mitsutoshi Watanabe, Kyoto (JP); Naohisa Kitazawa, Kyoto (JP); Yoshiharu Iwanami, Kyoto (JP)

(73) Assignee: MAXELL, LTD., Kyoto (JP)

( * ) Notice: Subject to any disclaimer, the term of this patent is extended or adjusted under 35 U.S.C. 154(b) by 317 days.

(21) Appl. No.: 18/253,841

(22) PCT Filed: Mar. 9, 2021

(86) PCT No.: PCT/JP2021/009326
§ 371 (c)(1),
(2) Date: May 22, 2023

(87) PCT Pub. No.: WO2022/113389
PCT Pub. Date: Jun. 2, 2022

(65) Prior Publication Data
US 2024/0003843 A1 Jan. 4, 2024

(30) Foreign Application Priority Data
Nov. 25, 2020 (JP) .................. 2020-195501

(51) Int. Cl.
*G01N 27/404* (2006.01)
*G01N 27/30* (2006.01)
*G01N 27/413* (2006.01)

(52) U.S. Cl.
CPC ......... *G01N 27/413* (2013.01); *G01N 27/304* (2013.01); *G01N 27/404* (2013.01)

(58) Field of Classification Search
CPC ... G01N 27/413; G01N 27/304; G01N 27/404
See application file for complete search history.

(56) References Cited

U.S. PATENT DOCUMENTS 4,652,359 A 3/1987 Niedrach et al.
4,681,673 A 7/1987 Niedrach et al.
(Continued)

FOREIGN PATENT DOCUMENTS

EP 0 180 161 A2 5/1986
EP 3 832 297 A1 6/2021
(Continued)

OTHER PUBLICATIONS

Extended (Supplementary) European Search Report dated Apr. 30, 2024, issued in counterpart application No. 21897369.1. (5 pages).
(Continued)

*Primary Examiner* — Alexander S Noguerola
(74) *Attorney, Agent, or Firm* — WHDA, LLP (57) ABSTRACT

An electrochemical oxygen sensor according to the present invention includes a positive electrode, a negative electrode, and an electrolyte solution constituted by an aqueous solution, in which the negative electrode includes a metal containing, as a main component, an element M selected from Sn and Ni, the electrolyte solution is an aqueous solution having a pH of 3 to 10, the positive electrode includes a catalyst layer containing a catalytic metal, and the catalyst layer includes, on a surface that is in contact with the electrolyte solution, a surface layer containing the element M.

14 Claims, 3 Drawing Sheets

(56) References Cited

U.S. PATENT DOCUMENTS

| | | | |
|---|---|---|---|
| 4,705,617 A | 11/1987 | Beebe et al. | |
| 5,321,971 A | 6/1994 | Hobbs et al. | |
| 2014/0090977 A1 | 4/2014 | Boardman | |
| 2019/0219535 A1* | 7/2019 | Kitazawa | G01N 27/416 |
| 2021/0255135 A1 | 8/2021 | Kitazawa et al. | |

FOREIGN PATENT DOCUMENTS

| | | |
|---|---|---|
| FR | 1471380 A | 3/1967 |
| FR | 2585472 A1 | 1/1987 |
| GB | 1044456 A | 9/1966 |
| GB | 2178540 A | 2/1987 |
| JP | S54-008591 A | 1/1979 |
| JP | S61-112954 A | 5/1986 |
| JP | 2006-194708 A | 7/2006 |
| JP | 2015-505358 A | 2/2015 |
| JP | 2017-067596 A | 4/2017 |
| JP | 2019-066332 A | 4/2019 |
| WO | 2013/049752 A1 | 4/2013 |
| WO | 2020/079769 A1 | 4/2020 |

OTHER PUBLICATIONS

English Translation of International Search Report dated May 18, 2021, issued in counterpart Application No. PCT/JP2021/009326. (3 pages).

* cited by examiner

ELECTROCHEMICAL OXYGEN SENSOR AND METHOD FOR MANUFACTURING THE SAME

TECHNICAL FIELD

The present invention relates to an electrochemical oxygen sensor with improved reliability in measuring a gas having a low oxygen concentration, and a method for manufacturing the same.

BACKGROUND ART

Electrochemical oxygen sensors (also referred to as "oxygen sensors" hereinafter) are advantageous since they are inexpensive, convenient and can operate at room temperature. Thus, these oxygen sensors have been used widely in various fields, such as for checking the degree of oxygen deficiency in holds of ships and in manholes and for detecting the oxygen concentration in medical equipment such as anesthesia apparatuses and respirators.

As an example of such an electrochemical oxygen sensor, there has been known an electrochemical oxygen sensor which includes an aqueous electrolyte solution, and a negative electrode formed using Sn or a Sn alloy (Patent Documents 1 and 2, for example).

PRIOR ART DOCUMENTS

Patent Document

Patent Document 1: JP 2006-194708A
Patent Document 2: JP 2017-67596A

DISCLOSURE OF INVENTION

Problem to be Solved by the Invention

In an electrochemical oxygen sensor, when oxygen enters the electrochemical oxygen sensor, oxygen is reduced at a positive electrode, and a metal elution reaction occurs at a negative electrode, thus generating a current between the positive electrode and the negative electrode that corresponds to an oxygen concentration. Therefore, a current generated through a positive electrode reaction (reduction of oxygen at the positive electrode) is converted into a voltage, and the oxygen concentration is obtained based on the voltage value, for example. Thus, when an electrochemical oxygen sensor is placed in an oxygen-free environment, the positive electrode reaction described above does not occur. Therefore, since the above-mentioned current is not generated, it should be possible to measure that the oxygen concentration is zero. However, in reality, despite being placed in an oxygen-free environment, if observation is continued for a certain amount of time, measurement results may be obtained that appear to indicate that oxygen is present. Thus, there is a problem that, depending on the configuration of an oxygen sensor, it may be difficult to use an oxygen sensor to measure low-concentration oxygen gas, and an issue arises in that an oxygen concentration measurement range is limited.

The present invention was made in view of the above-described circumstances and aims to provide an electrochemical oxygen sensor with improved reliability in measuring a gas having a low oxygen concentration, and a method for manufacturing the same.

Means for Solving Problem

An electrochemical oxygen sensor according to the present invention includes a positive electrode, a negative electrode, and an electrolyte solution constituted by an aqueous solution, in which the negative electrode includes a metal containing, as a main component, an element M selected from Sn and Ni, the electrolyte solution is an aqueous solution having a pH of 3 to 10, the positive electrode includes a catalyst layer containing a catalytic metal, and the catalyst layer includes, on a surface that is in contact with the electrolyte solution, a surface layer containing the element M.

The electrochemical oxygen sensor according to the present invention can be manufactured using a manufacturing method according to the present invention, the method including a sensor assembling step of assembling the electrochemical oxygen sensor using a positive electrode including a catalyst layer containing a catalytic metal, a negative electrode including a metal containing, as a main component, an element M selected from Sn and Ni, and an electrolyte solution constituted by an aqueous solution having a pH of 3 to 10; and a surface layer forming step of forming a surface layer containing the element M on a surface of the positive electrode before or after the sensor assembling step.

Effects of the Invention

According to the present invention, it is possible to provide an electrochemical oxygen sensor with improved reliability in measuring an oxygen concentration in a gas having a low oxygen content, and a method for manufacturing the same.

DESCRIPTION OF THE INVENTION

Figure 1:
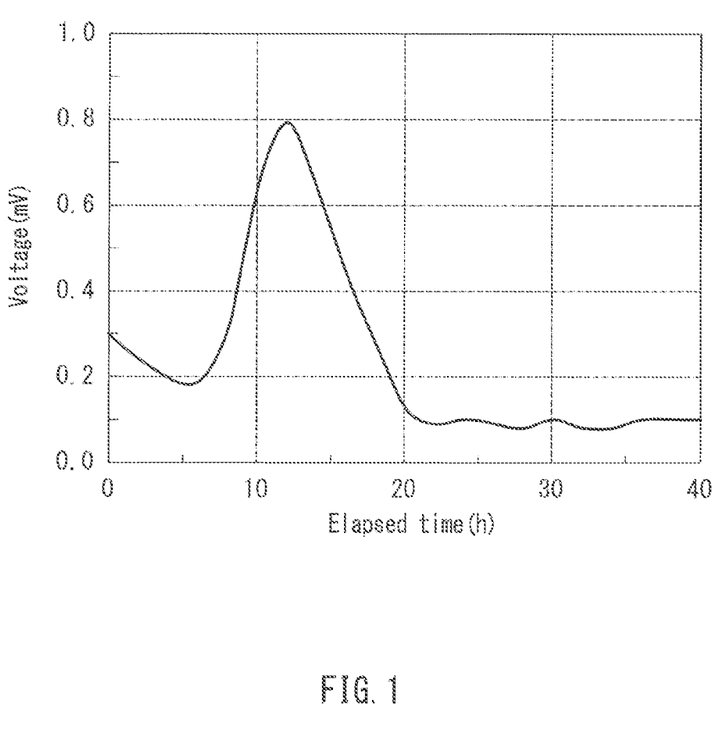
FIG. 1 is a graph showing changes in an output voltage when an electrochemical oxygen sensor having a negative electrode containing Sn is used in an oxygen-free environment.

It was revealed through the studies conducted by the inventors of the present invention that, as shown in FIG. 1, when an electrochemical oxygen sensor (which may be referred to as an "oxygen sensor" hereinafter) was used in an oxygen-free environment, a voltage increase was observed for a given period of time as if oxygen was present, and, when measurement was continued, the voltage increase was no longer observed. The inventors of the present invention examined a reaction that occurred in the oxygen sensor, and as a result, thought that the voltage increase may occur for the following reasons.

At the positive electrode of the oxygen sensor, the reaction represented by Chemical Equation (1) below occurs when oxygen is present.

$$O_2 + 4H^+ + 4e^- \rightarrow H_2O \qquad (1)$$

However, if the oxygen sensor is placed in an oxygen-free environment, the reaction represented by Chemical Equation (1) above does not occur at the positive electrode. On the other hand, when the positive electrode and the negative electrode are electrically connected to each other in a state where oxygen is not supplied to the positive electrode, the element M is eluted from the negative electrode due to a potential difference, and a current flows between the positive and negative electrodes. Thus, reactions represented by Chemical Equations (2) to (4) below may occur at the positive electrode. Note that Chemical Equations (3) and (4) below indicate reactions occurring at the positive electrode when the oxygen sensor has a negative electrode containing Sn.

$$2H^+ + 2e^- \rightarrow H_2 \quad (2)$$

$$Sn^{4+} + 4e^- \rightarrow Sn \quad (3)$$

$$Sn^{2+} + 2e^- \rightarrow Sn \quad (4)$$

As described above, when the oxygen sensor is used in an oxygen-free environment, a voltage increases when a certain amount of time has passed, whereas the voltage no longer increases after a given period of time. It is considered that, during this period of time, the reaction of Sn deposition represented by Chemical Equation (3) or (4) proceeds at the positive electrode, instead of the reaction of hydrogen generation represented by Chemical Equation (2), and when the potential at the positive electrode gradually decreases and becomes equal to the potential at the negative electrode, the current becomes zero, the deposition of Sn at the positive electrode ends, and a voltage is not abnormally generated in the oxygen sensor. Based on the above findings, the inventors of the present invention considered that, by forming a layer containing an element M contained in a negative electrode, in advance, on a surface of a catalyst layer that is in contact with an electrolyte solution, it would be possible to prevent the reactions at the positive electrode, and to improve reliability when a gas having a low oxygen concentration is measured.

In the oxygen sensor according to the present invention, because a layer containing the same element as the element M contained in a metal contained in the negative electrode, i.e., a metal containing the element M as a main component selected from Sn and Ni, is formed on the surface of the catalyst layer containing a catalytic metal in the positive electrode, the surface that is in contact with the electrolyte solution, it is possible to prevent a voltage increase caused through a deposition reaction of metal ions eluted from the negative electrode at the positive electrode when the oxygen sensor is used in an oxygen-free environment. As a result, the oxygen sensor according to the present invention is capable of measuring the concentration of oxygen in a wide concentration range, and for example, the oxygen sensor can be used in a gas having a low oxygen concentration, including an oxygen-free environment.

In particular, because Sn is likely to diffuse even at low temperatures, if Sn is layered on the surface of the catalytic metal such as Au, it is considered that Sn is alloyed with the catalytic metal through interdiffusion, forming, on the surface, a layer alloyed with the catalytic metal, such as a Au—Sn alloy.

Also, it is presumed that the metal element is oxidized and present as oxides in at least a surface layer portion of the surface of the catalyst layer that is in contact with the electrolyte solution.

Therefore, the "surface layer" that is formed on the surface of the catalyst layer that is in contact with the electrolyte solution and containing the same element as an element (Sn or Ni), which is the main component of the metal contained in the negative electrode, includes a layer containing the element alone, a layer containing an alloy of the element, a layer containing an alloy of a catalytic metal and the element, a layer containing an oxide of the element, and the like.

Note that the phrase "metal containing an element M serving as a main component" and the phrase "metal containing an element M as a main component" used in this specification refer to a metal containing more than 50% by mass of the element M.

Next, an oxygen sensor according to the present invention will be described with reference to the drawing, using, as an example, a galvanic cell type oxygen sensor, which is a suitable embodiment.

Figure 2:
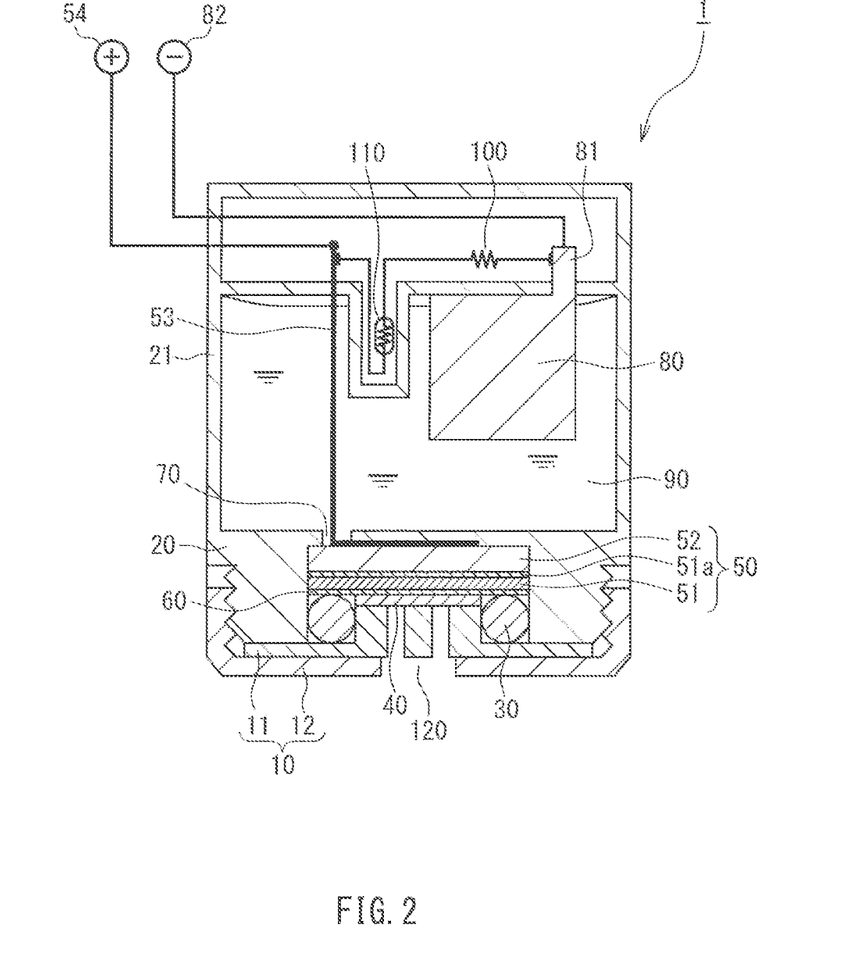
FIG. 2 is a cross-sectional view schematically showing one example of an electrochemical oxygen sensor according to the present invention.

FIG. 2 is a cross-sectional view schematically showing a galvanic cell type oxygen sensor according to one embodiment of the electrochemical oxygen sensor of the present invention.

The oxygen sensor 1 shown in FIG. 2 has a positive electrode 50, a negative electrode 80, and an electrolyte solution 90 in a tubular container 20 having a bottom. The container 20 is constituted by a container main body 21 that contains the electrolyte solution 90 inside, and a sealing lid 10 for fixing a protective fin 40, a barrier membrane 60 and the positive electrode 50 in an opening portion of the container main body 21. The sealing lid 10 is constituted by a first sealing lid (inner lid) 11, and a second sealing lid (outer lid) 12 for fixing the first sealing lid 11, and has a through hole 120 for taking oxygen into the oxygen sensor 1, and is attached to the container main body 21 via an O-ring 30.

The negative electrode 80 is arranged inside the container main body 21 that stores the electrolyte solution 90 in a state in which the negative electrode 80 is immersed in the electrolyte solution, and the negative electrode 80 is provided with a lead portion 81. Also, the positive electrode 50 is composed by stacking a catalyst layer (catalytic electrode) 51 and a positive electrode current collector 52, and the lead wire 53 is attached to the positive electrode current collector 52. Further, a lower portion of the container main body 21 of the container 20 that stores the electrolyte solution 90 is provided with a bore 70 to allow the passage of the lead wire 53 attached to the positive electrode current collector 52. Also, although not shown in FIG. 2, the lower portion of the container main body 21 is also provided with a bore for supplying the electrolyte solution to the positive electrode 50, separately from the bore 70.

A correction resistor 100 and a temperature compensation thermistor 110 are connected in series between the lead portion 81 of the negative electrode 80 and the lead wire 53 attached to the positive electrode current collector 52 and are housed in the container main body 21. Also, a negative electrode terminal 82 is connected to the lead portion 81 of the negative electrode 80, and a positive electrode terminal 54 is connected to the lead wire 53 attached to the positive electrode current collector 52, and these terminals are led out to the outside of the container main body 21.

A barrier membrane 60, which selectively allows oxygen to pass therethrough and limits the amount of oxygen passing therethrough to match a cell reaction, is arranged on an outer surface side of the positive electrode 50, and oxygen passing through the through hole 120 provided in the sealing lid 10 is introduced into the positive electrode 50 through the barrier membrane 60. Also, a protective film 40 for preventing dirt, dust, water, or the like from adhering to the barrier membrane 60 is arranged on the outer surface side of the barrier membrane 60, and is fixed by the first sealing lid 11.

That is, the first sealing lid 11 functions as a pressing end plate for pressing the protective film 40, the barrier membrane 60, and the positive electrode 50. In the oxygen sensor 1 shown in FIG. 2, a threaded portion is formed on an inner circumferential portion of the second sealing lid 12 to be screwed onto a threaded portion formed on an outer circumferential portion of the opening portion of the container main body 21. Then, the first sealing lid 11 is pressed against the container main body 21 via the O-ring 30 by screwing the sealing lid 10 on, and thus, the protective film 40, the barrier membrane 60, and the positive electrode 50 can be fixed to the container main body 21 in a state in which airtightness and liquid tightness are maintained.

Then, a surface layer 51a containing the same element as the element M, which is the main component of the metal contained in the negative electrode, is formed on a surface (an upper surface in FIG. 2) of the catalyst layer 51 of the positive electrode 50 that is in contact with the electrolyte solution.

One of Sn and Ni or an alloy of the element (an alloy containing one of Sn and Ni as a main component (the content thereof in the alloy is more than 50% by mass)) is used in the negative electrode of the oxygen sensor. Although the element alone or an alloy thereof may contain a certain amount of impurities, it is desired that the content of Pb is lower than 1000 ppm to comply with the RoHS Directive.

From the viewpoint of corrosion resistance, examples of the Sn alloy that can be used in the negative electrode include Sn—Ag alloys, Sn—Cu alloys, Sn—Ag—Cu alloys, and Sn—Sb alloys, and alloys containing metal elements such as Al, Bi, Fe, Mg, Na, Zn, Ca, Ge, In, Ni, and Co may also be used.

Specifically, preferred examples of the Sn alloy are general lead-free solder materials (Sn-3.0Ag-0.5Cu, Sn-3.5Ag, Sn-3.5Ag-0.75Cu, Sn-3.8Ag-0.7Cu, Sn-3.9Ag-0.6Cu, Sn-4.0Ag-0.5Cu, Sn-1.0Ag-0.5Cu, Sn-1.0Ag-0.7Cu, Sn-0.3Ag-0.7Cu, Sn-0.75Cu, Sn-0.7Cu—Ni—P—Ge, Sn-0.6Cu—Ni—P—GeSn-1.0Ag-0.7Cu—Bi—In, Sn-0.3Ag-0.7Cu-0.5Bi—Ni, Sn-3.0Ag-3.0Bi-3.0In, Sn-3.9Ag-0.6Cu-3.0.Sb, Sn-3.5Ag-0.5Bi-8.0In, Sn-5.0Sb, Sn-10Sb, Sn-0.5Ag-6.0Cu, Sn-5.0Cu-0.15Ni, Sn-0.5Ag-4.0Cu, Sn-2.3Ag—Ni—Co, Sn-2Ag-Cu—Ni, Sn-3Ag-3Bi-0.8Cu—Ni, Sn-3.0Ag-0.5Cu—Ni, Sn-0.3Ag-2.0Cu—Ni, Sn-0.3Ag-0.7Cu—Ni, Sn-58Bi, Sn-57Bi-1.0Ag, and the like), and Sn—Sb alloys.

From the viewpoint of corrosion resistance, examples of the Ni alloy that can be used in the negative electrode include Ni—V alloys, Ni—Cr alloys, Ni—Si alloys, Ni—Al alloys, Ni—Ti alloys, Ni—Mo alloys, Ni—Mn alloys, Ni—Zn alloys, Ni—Sn alloys, Ni—Cu alloys, Ni—Co alloys, and Ni—Fe alloys, and alloys containing metal elements other than the above metal elements.

Specifically, preferred examples of the Ni alloy are Ni66-Cu29-Al3, Ni63-Cu3O—Si4, Ni63-Cu3O—Si3, Ni62-Mo28-Fe5, Ni68-Mo28-Fe2-Cr1-Co1, Ni57-Mo17-Cr16-Fe4—W3, Ni22-Cr9-Mo0.6-W18.5-Fe1.5-Co0.6, and the like.

The negative electrode is preferably made of Sn or a Sn alloy, and is more preferably made of a Sn alloy because it is unlikely to be corroded in an electrolyte solution constituted by an aqueous solution having a pH of 3 to 10, and can suppress generation of hydrogen at the positive electrode in an oxygen-free environment.

As shown in FIG. 2, an electrode constituted by a catalyst layer containing a catalytic metal and a positive electrode current collector is used for the positive electrode of the oxygen sensor, for example. Although the constituent material of the catalyst layer is not particularly limited as long as a current can be generated through an electrochemical reduction of oxygen on the positive electrode, a redox-active metal (including an alloy of the element) such as gold (Au), silver (Ag), platinum (Pt), and titanium (Ti) are suitably used. Au is more preferable.

A surface layer containing the same element as the element M, which is the main component of the metal contained in the negative electrode, is formed on a surface of the catalyst layer of the positive electrode that is in contact with the electrolyte solution. That is to say, if the negative electrode contains Sn (if the negative electrode is constituted by Sn or constituted by an alloy containing Sn as a main component), Sn is added to the surface layer of the positive electrode, and if the negative electrode contains Ni (if the negative electrode is constituted by Ni or constituted by an alloy containing Ni as a main component), Ni is added to the surface layer of the positive electrode.

The surface layer may be constituted by only the same element as the element M, which is the main component of the metal contained in the negative electrode, or may be constituted by an alloy (the percentage of the element M in the alloy exceeds 50% by mass) containing the same element as the element M, which is the main component of the metal contained in the negative electrode. When the surface layer is constituted by an alloy containing the same element as the element M, examples of the element in the alloy can include various metal elements mentioned as examples that can be added when the negative electrode is constituted by an alloy of the element M.

From the viewpoint of favorably ensuring the effect of preventing an unnecessary positive electrode reaction in an oxygen-free environment in the oxygen sensor, the amount of the element M (the same element as the element M contained in the negative electrode) per unit area of the surface layer is preferably 10 µg/cm$^2$ or more, and more preferably 50 µg/cm$^2$ or more. Also, the amount of the element M per unit area of the surface layer is preferably 10 mg/cm$^2$ or less, and more preferably 4 mg/cm$^2$ or less so as not to inhibit the action of the catalytic metal.

An electrolyte solution constituted by an aqueous solution is used for the electrolyte solution of the oxygen sensor, and it is possible to use acidic aqueous solutions containing carboxylic acid and a salt thereof, such as an aqueous solution containing acetic acid, potassium acetate, and lead acetate and an aqueous solution containing citric acid and a citric acid salt (alkali metal salt or the like); and alkaline aqueous solutions such as an aqueous solution of sodium hydroxide and an aqueous solution of potassium hydroxide.

Further, an aqueous solution that constitutes the electrolyte solution may contain various organic acids, inorganic acids, and alkalis as needed for the purpose of pH adjustment.

Note that, from the viewpoint of achieving an extension of the service life of the oxygen sensor, it is preferable to use an aqueous solution containing a chelating agent in the electrolyte solution. It is presumed that a chelating agent has an action of chelating the constituent metal (element M) of the negative electrode and dissolving the chelated metal in the electrolyte solution (referred to as a "chelating action"

hereinafter), and it is considered that the chelating action may contribute to an extension of the service life of the oxygen sensor.

A "chelating agent" used in this specification has a molecule (including ions) having multiple functional groups that are in a coordinate bond with a metal ion, and forms a complex (complexation) with the metal ion, thereby inactivating the metal ion. A chelating agent can be added to an electrolyte solution in the form of an acid, which generates the above molecules in a solvent that constitutes the electrolyte solution, or a salt thereof. Therefore, acids having a single functional group, such as phosphoric acid, acetic acid, and carbonic acid that have weak complexing power, and salts thereof, are not included in the "chelating agent" used in this specification.

Because metal ions such as $Sn^{2+}$ eluted from the negative electrode during discharging are unstable in the electrolyte solution when the pH of the electrolyte solution is in a pH range of weak acid to weak alkaline, the metal ions may immediately be deposited on the negative electrode as oxides or hydroxides, and inhibit reactions at the negative electrode. However, in the present invention, the eluted metal ions are chelated and deposited stably as complex ions, and thus it is possible to prevent reactions at the negative electrode from being inhibited.

Chelating agents usually have chelating action and pH buffer capacity (the capacity to keep the pH of a solution substantially constant even if a small amount of acid or base is added). Specific examples thereof can include succinic acid, fumaric acid, maleic acid, citric acid, tartaric acid, glutaric acid, adipic acid, malic acid, malonic acid, aspartic acid, glutamic acid, and ascorbic acid, and salts thereof, and these may be used alone or in combination of two or more.

From the viewpoint of enhancing the chelating action, it is more preferable to use, as a chelating agent, a substance with high solubility in water, and specifically, citric acid, tartaric acid, and glutamic acid, and salts thereof. In particular, citric acid and salts thereof are highly soluble in water (citric acid: 73 g/100 ml (25° C.), trisodium citrate: 71 g/100 ml (25° C.), tripotassium citrate: 167 g/100 ml (25° C.)). Also, citric acid has a large number of dissociable hydrogen atoms, and has multiple pH values where the pH buffer capacity is exhibited ($pKa_1$=3.13, $pKa_2$=4.75, $pKa_3$=6.40). Therefore, citric acid is more preferably used. Thus, when citric acid is used as a chelating agent, citric acid is highly soluble in water, and the pH buffer capacity thereof is enhanced, thus further extending the service life of the oxygen sensor.

The concentration of the chelating agent in the electrolyte solution is preferably 2.3 mol/L or more, and more preferably 2.5 mol/L or more, and particularly preferably 2.7 mol/L or more, for example.

Note that, when a metal that is dissolved in the electrolyte solution and originates from the negative electrode reaches a saturation concentration, an oxide of the metal is generated and the negative electrode becomes inactive, which may shorten the service life of the oxygen sensor. Even if a chelating agent is added to the electrolyte solution, the effect of extending the service life of the oxygen sensor may be limited. In this case, it is preferable to increase the molar concentration of the chelating agent in the electrolyte solution by further adding ammonia to the electrolyte solution, and thereby it is possible to delay the saturation of the metal that is dissolved in the electrolyte solution and originates from the negative electrode, and further extend the service life of the oxygen sensor.

The concentration of ammonia in the electrolyte solution is 0.01 mol/L or higher in order to facilitate the above-mentioned action of ammonia, preferably 0.1 mol/L or higher and more preferably 1 mol/L or higher in order to further facilitate the action. Further, although the upper limit of the concentration of ammonia in the electrolyte solution is not particularly specified, ammonia is a compound specified in Appendix 2 of the "Poisonous and Deleterious Substances Control Law" in Japan, and thus, the concentration of ammonia in the electrolyte solution is preferably set to less than 10% by mass from the viewpoint of safety.

The aqueous solution that constitutes the electrolyte solution has a pH of 3 to 10. In the case where the electrolyte solution has such a pH, in an oxygen sensor placed in an oxygen-free environment, a reaction in which the element M is slightly eluted from the negative electrode and is deposited at the positive electrode is likely to occur. However, as described above, according to the present invention, it is possible to prevent the problem of a voltage increase in the oxygen sensor due to such a deposition reaction.

A barrier membrane to control the entry of oxygen is preferably disposed on an outer surface of the positive electrode of the oxygen sensor so as not to allow an excess amount of oxygen to reach the catalytic electrode. Preferably, a barrier membrane selectively allows oxygen to pass therethrough and also can limit the amount of oxygen gas passing therethrough. The material and the thickness of the barrier membrane are not particularly limited, and a fluoropolymer such as polytetrafluoroethylene or a tetrafluoroethylene-hexafluoropropylene copolymer, a polyolefin such as polyethylene, or the like is typically used. It is possible to use porous membranes, non-porous membranes, and further, membranes having holes provided with capillary tubes, which are called capillary-type membranes, as a barrier membrane.

Furthermore, in order to protect the barrier membrane, it is preferable to dispose a protective film constituted by a porous resin film on the barrier membrane. The material and thickness of the protective film are not particularly limited as long as the protective film has a function of preventing dirt, dust, water, or the like from adhering to the barrier membrane, and a function of allowing air (including oxygen) to pass therethrough, and a fluoropolymer such as polytetrafluoroethylene is typically used.

The container main body 21 of the oxygen sensor 1 can be constituted by acrylonitrile-butadiene-styrene (ABS) resin, for example. Also, the sealing lid 10 (the first sealing lid 11 and the second sealing lid 12) arranged on the opening portion in the container main body 21 may be constituted by ABS resin, polypropylene, polycarbonate, fluoropolymer, or the like, for example.

Also, the O-ring 30 interposed between the container main body 21 of the container 20 and the holder lid 10 (the first holder lid 11) is pressed and deformed by screwing the second sealing lid 12 onto the container main body 21, thereby allowing the airtightness and the liquid tightness of the oxygen sensor 1 to be maintained. The material of the O-ring is not particularly limited, and nitrile rubber, silicone rubber, ethylene-propylene rubber, a fluoropolymer, or the like is typically used.

Although the present invention has been described using, as an example, a galvanic cell type oxygen sensor, which is one embodiment of an electrochemical oxygen sensor according to the present invention, the electrochemical oxygen sensor of the present invention is not limited to the above-described embodiment, and various changes and modifications can be made within the scope of the technical idea of the invention. Also, with regard to the oxygen sensor shown in FIG. 2 as well, various changes and modifications in design may be made as long as functions as the oxygen sensor and the above-described oxygen supply pathways are provided.

Also, the electrochemical oxygen sensor of the present invention may be in the form of a potentiostatic type oxygen sensor. The potentiostatic type oxygen sensor is a sensor configured such that a constant voltage is applied between a positive electrode and a negative electrode, and the voltage to be applied is set depending on the electrochemical characteristics of the respective electrodes and the type of gas to be detected. In the potentiostatic type oxygen sensor, a current that flows between the positive electrode and the negative electrode when an appropriate constant voltage is applied therebetween is proportional to the oxygen gas concentration. Thus, by converting the current to a voltage, it becomes possible to detect the oxygen gas concentration in an unknown gas by measuring the voltage, similarly to the case of a galvanic cell type oxygen sensor.

The electrochemical oxygen sensor according to the present invention can be manufactured using an assembling method using a positive electrode provided with a surface layer in advance using a vapor deposition method, a plating method, or the like on a surface of a catalyst layer (catalytic electrode), a negative electrode containing a metal containing the element M as a main component selected from Sn and Ni, and an electrolyte solution constituted by an aqueous solution having a pH of 3 to 10.

Also, the electrochemical oxygen sensor can be manufactured using a manufacturing method including a sensor assembling step of assembling an oxygen sensor using a positive electrode, a negative electrode containing a metal including the element M as the main component, an electrolyte solution constituted by an aqueous solution having a pH of 3 to 10; and a step of forming a surface layer on a surface of the catalyst layer of the positive electrode that is in contact with the electrolyte solution through deposition of the element M from the electrolyte solution by supplying a gas having an oxygen concentration of 0.3% by volume or less or a gas that does not contain oxygen to the positive electrode for a given period of time in a state where the positive electrode and the negative electrode are electrically connected to each other, after the sensor assembling step. According to this manufacturing method, because a step of forming a surface layer on the positive electrode in advance can be omitted, the productivity of the electrochemical oxygen sensors can be further improved. In this case, it is sufficient that the time it takes to electrically connect the positive electrode and the negative electrode to each other and deposit the element M on the surface of the main body portion of the positive electrode is 50 to 150 hours, for example.

The electrochemical oxygen sensor according to the present invention can be preferably applied to applications for use in an oxygen-free environment, and can also be applied to the same applications as those for conventionally known electrochemical oxygen sensors.

EXAMPLES

Hereinafter, the present invention will be described more specifically with reference to examples. However, the following examples do not limit the present invention.

Example 1

<Preparation of Electrolyte Solution>

An electrolyte solution was prepared by dissolving citric acid, tripotassium citrate, and ammonia in water. Note that the molar concentration of citric acid was 2.5 mol/L, the molar concentration of tripotassium citrate was 0.5 mol/L, and the molar concentration of ammonia was 3.0 mol/L in the electrolyte solution. The pH of the electrolyte solution was 4.30 at 25° C.

<Assembling of Oxygen Sensor>

5.4 g of the electrolyte solution was injected into the container main body 21 made of ABS resin, and a galvanic cell type oxygen sensor having the configuration shown in FIG. 2 was assembled. Similarly to the container main body 21, the sealing lid 10 (the first sealing lid 11 and the second sealing lid 12) were also formed using ABS resin. Also, a porous polytetrafluoroethylene sheet was used as the protective film 40, and a tetrafluoroethylene-hexafluoropropylene copolymer film was used as the barrier membrane 60.

The catalyst layer (catalytic electrode) 51 of the positive electrode 50 was made of gold, the positive electrode current collector 52 made of titanium and the lead wire 53 made of titanium were welded together into a single body. Also, the negative electrode 80 was made of a Sn—Sb alloy (Sb content: 5% by mass).

Further, the correction resistor 100 and the temperature compensation thermistor 110 were connected in series between the lead wire 53 of the positive electrode and the lead portion 81 of the negative electrode, and the positive electrode terminal 54 was led out from the lead wire 53 of the positive electrode and the negative electrode terminal 82 was led out from the lead portion 81 of the negative electrode to the outside of the container main body 21, thus making it possible to detect an oxygen concentration based on an output voltage.

In the assembled oxygen sensor 1, the first sealing lid 11, the O-ring 30, the protective film 40 constituted by a polytetrafluoroethylene sheet, the barrier membrane 60 made of a tetrafluoroethylene-hexafluoropropylene copolymer, the catalytic electrode 51, and the positive electrode current collector 52 were pressed by screwing the second sealing lid 12 onto the container main body 21, and a favorable sealed state was maintained.

<Formation of Surface Layer>

The sensor was left for 100 hours while nitrogen gas (oxygen concentration was 0% by volume) was being supplied to the surface of the positive electrode 50 through the through holes 120 in a state where the positive electrode 50 and the negative electrode 80 of the assembled oxygen sensor 1 were electrically connected to each other, and a surface layer containing Sn contained in the negative electrode was formed on the surface (a surface that is in contact with the electrolyte solution on the upper side in FIG. 2) of the catalyst layer 51 of the positive electrode 50. The amount of Sn per unit area of the formed surface layer was 150 $\mu g/cm^2$.

Example 2

An oxygen sensor was assembled in the same manner as in Example 1, except that a Sn layer (the surface layer, the amount of Sn per unit area thereof was 150 $\mu g/cm^2$) was formed through plating on one surface of the catalyst layer (catalytic electrode) of the positive electrode, and the obtained positive electrode was used.

Comparative Example 1

An oxygen sensor assembled in the same manner as in Example 1 was used as an oxygen sensor of Comparative Example 1 without forming the above-described surface layer.

Figure 3:
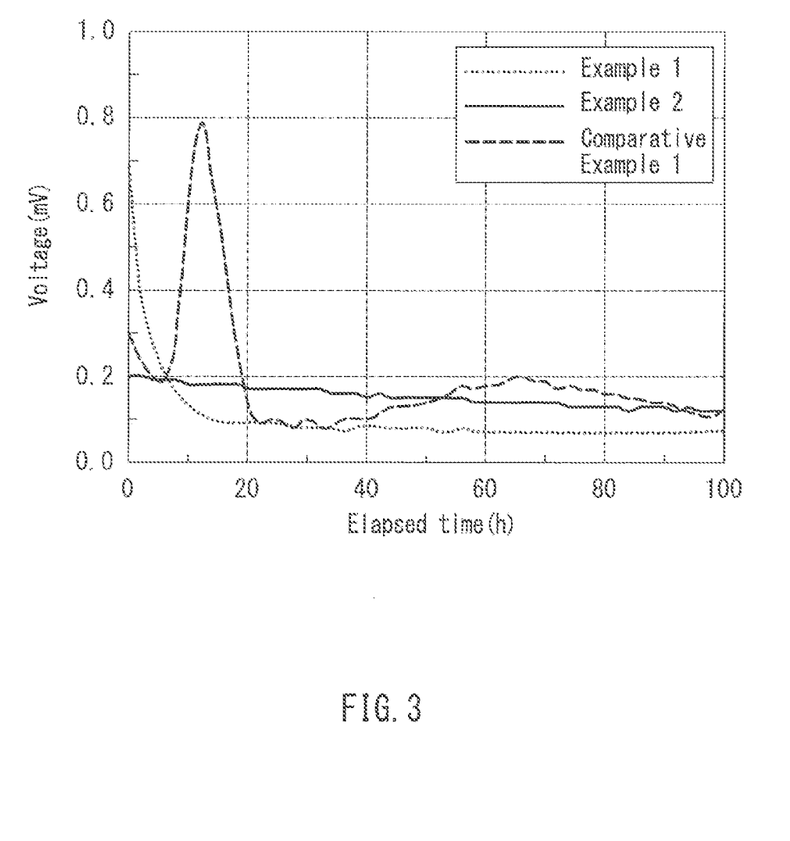
FIG. 3 is a graph showing results of evaluation tests on properties of electrochemical oxygen sensors of Examples 1 and 2 and Comparative Example 1.

The oxygen sensors of Examples 1 and 2 and Comparative Example 1 were kept in nitrogen gas for 100 hours, and the output voltage was measured during that time. The results are shown in FIG. 3.

With the oxygen sensors of Examples 1 and 2, the output voltage after measurement was started did not increase, with the oxygen sensor of Example 1, the output voltage was almost zero several hours after the measurement was started, and with the oxygen sensor of Example 2, the output voltage was almost zero when the measurement was started, and thus the oxygen concentration was able to be stably measured. On the other hand, with the oxygen sensor of Comparative Example 1, it was found that the output voltage increased temporarily several hours after the measurement was started, and variations in the measured values of the oxygen concentration increased.

The invention may be embodied in other forms without departing from the essential characteristics thereof. The embodiments disclosed in this application are to be considered in all respects as illustrative and not limiting. The scope of the present invention should be construed in view of the appended claims, rather than the foregoing description, and all changes that come within the meaning and range of equivalency of the claims are intended to be embraced therein.

DESCRIPTION OF REFERENCE NUMERALS

1 Oxygen sensor
10 Sealing lid
11 First sealing lid (inner lid)
12 Second sealing lid (outer lid)
20 Container
21 Container main body
30 O-ring
40 Protective film
50 Positive electrode
51 Catalyst layer (catalytic electrode)
51a Surface layer
52 Positive electrode current collector
53 Lead wire
54 Positive electrode terminal
60 Barrier membrane
70 Bore
80 Negative electrode
81 Lead portion
82 Negative electrode terminal
90 Electrolyte solution
100 Correction resistor
110 Temperature compensation thermistor
120 Through hole

The invention claimed is:

1. An electrochemical oxygen sensor comprising:
a positive electrode;
a negative electrode; and
an electrolyte solution constituted by an aqueous solution,
wherein the negative electrode includes a metal containing, as a main component, an element M selected from Sn and Ni,
the electrolyte solution is an aqueous solution having a pH of 3 to 10,
the positive electrode includes a catalyst layer containing a catalytic metal, and
the catalyst layer includes, on a surface that is in contact with the electrolyte solution, a surface layer containing the element M.

2. The electrochemical oxygen sensor according to claim 1,
wherein the catalyst layer of the positive electrode contains gold.

3. The electrochemical oxygen sensor according to claim 1,
wherein the electrolyte solution contains a chelating agent.

4. The electrochemical oxygen sensor according to claim 3,
wherein a concentration of the chelating agent in the electrolyte solution is 2.3 mol/L or more.

5. The electrochemical oxygen sensor according to claim 3,
wherein the electrolyte solution contains at least one of citric acid and salts thereof as the chelating agent.

6. The electrochemical oxygen sensor according to claim 3,
wherein the electrolyte solution further contains ammonia.

7. The electrochemical oxygen sensor according to claim 6,
wherein a concentration of ammonia in the electrolyte solution is 0.01 mol/L or more.

8. The electrochemical oxygen sensor according to claim 6,
wherein a concentration of ammonia in the electrolyte solution is 0.1 mol/L or more.

9. The electrochemical oxygen sensor according to claim 1,
wherein the negative electrode contains Sn or a Sn alloy.

10. The electrochemical oxygen sensor according to claim 9,
wherein the catalytic metal in the catalyst layer contains Au, and the surface layer contains Sn and Au.

11. The electrochemical oxygen sensor according to claim 1,
wherein an amount of the element M per unit area of the surface layer is 10 µg/cm$^2$ or more and 10 mg/cm$^2$ or less.

12. A method for manufacturing the electrochemical oxygen sensor according to claim 1, the method comprising:
assembling the electrochemical oxygen sensor using a positive electrode including a catalyst layer containing a catalytic metal, a negative electrode including a metal containing, as a main component, an element M selected from Sn and Ni, and an electrolyte solution constituted by an aqueous solution having a pH of 3 to 10; and
forming a surface layer containing the element M on a surface of the positive electrode before or after the sensor assembling.

13. The method for manufacturing the electrochemical oxygen sensor according to claim 12, comprising, supplying a gas having an oxygen concentration of 0.3% by volume or less to the positive electrode for at least a given period of time in a state where the positive electrode and the negative electrode are electrically connected to each other, after the sensor assembling.

14. The method for manufacturing the electrochemical oxygen sensor according to claim 13,
wherein the gas that is supplied to the positive electrode does not contain oxygen.

\* \* \* \* \*